(12) United States Patent
Matheis

(10) Patent No.: US 9,555,478 B2
(45) Date of Patent: Jan. 31, 2017

(54) CHUCK FOR A TOOL

(75) Inventor: Klaus Matheis, Sauldorf-Rast (DE)

(73) Assignee: Guehring OHG, Albstadt (DE)

( * ) Notice: Subject to any disclaimer, the term of this patent is extended or adjusted under 35 U.S.C. 154(b) by 78 days.

(21) Appl. No.: 13/336,377

(22) Filed: Dec. 23, 2011

(65) Prior Publication Data

US 2012/0211950 A1 Aug. 23, 2012

Related U.S. Application Data

(63) Continuation of application No. PCT/DE2010/000782, filed on Jul. 7, 2010.

(30) Foreign Application Priority Data

Feb. 9, 2009 (DE) .......................... 10 2009 039 683
Jul. 7, 2009 (DE) .......................... 10 2009 032 182

(51) Int. Cl.
*B23Q 11/10* (2006.01)
*B23B 31/02* (2006.01)
*F16B 35/04* (2006.01)

(52) U.S. Cl.
CPC .......... *B23B 31/028* (2013.01); *B23B 2231/24* (2013.01); *B23B 2250/12* (2013.01); *B23Q 11/1023* (2013.01); *F16B 35/041* (2013.01); *Y10T 279/17111* (2015.01); *Y10T 279/3487* (2015.01); *Y10T 408/44* (2015.01); *Y10T 409/304032* (2015.01)

(58) Field of Classification Search
CPC ... B23Q 11/1023; B23B 51/06; B23B 31/028; B23B 2231/24; B23B 2250/12
USPC ........ 279/20, 156; 408/56, 57; 409/135, 136
See application file for complete search history.

(56) References Cited

U.S. PATENT DOCUMENTS

| | | | | |
|---|---|---|---|---|
| 3,030,119 | A | * | 4/1962 | Myers .......................... 279/4.08 |
| 5,301,962 | A | * | 4/1994 | Killinger et al. .......... 279/105.1 |
| 5,984,595 | A | * | 11/1999 | Mizoguchi ...................... 408/57 |
| 6,270,086 | B1 | * | 8/2001 | Lloyd .............................. 279/51 |
| 6,572,119 | B2 | * | 6/2003 | Selb ................................ 279/52 |
| 7,090,448 | B2 | * | 8/2006 | Stoll et al. .................... 409/136 |
| 7,192,228 | B2 | | 3/2007 | Haenle et al. |
| 7,914,010 | B2 | * | 3/2011 | Herud .......................... 279/4.06 |
| 2003/0193148 | A1 | * | 10/2003 | Haag et al. .................. 279/4.03 |
| 2005/0275170 | A1 | * | 12/2005 | Haenle et al. ................. 279/20 |

(Continued)

FOREIGN PATENT DOCUMENTS

| | | |
|---|---|---|
| DE | 198 36 912 | 2/2000 |
| DE | 10 2005 013 483 | 9/2006 |

(Continued)

*Primary Examiner* — Daniel Howell
*Assistant Examiner* — Chwen-Wei Su
(74) *Attorney, Agent, or Firm* — Burr & Brown, PLLC

(57) ABSTRACT

A chuck for a tool comprises a device for supplying a cooling and/or lubricating medium to a medium channel in a tool held in the chuck, an adjusting screw, and securing means. The adjusting screw serves as a stop for the tool held in the chuck, is arranged in the chuck, is adjustable in relation to the chuck in the axial direction of the chuck, and interacts with a pipe element. The pipe element is held rotatably in the chuck and the securing means limit an axial displacement of the pipe element at least in the direction of the adjusting screw. The pipe element and the adjusting screw are connected in a rotationally fixed but axially displaceable manner with respect to each other.

15 Claims, 9 Drawing Sheets

(56) References Cited

U.S. PATENT DOCUMENTS

2008/0185793 A1    8/2008    Haimer et al.

FOREIGN PATENT DOCUMENTS

| DE | 20 2008 013 763 | 2/2009 |
| DE | 10 2008 039 197 | 2/2010 |
| WO | 2004/073910 | 9/2004 |

* cited by examiner

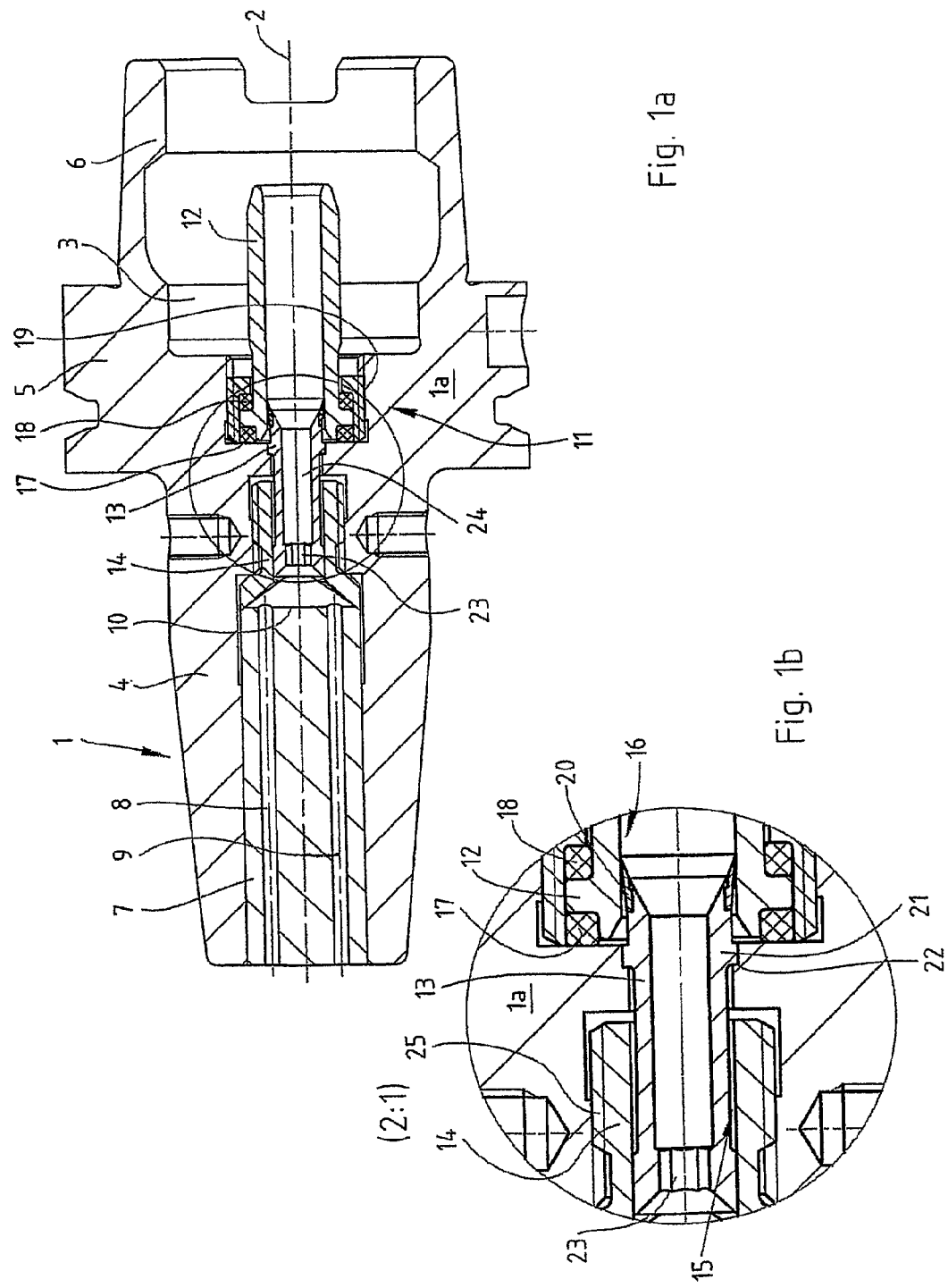

(2:1)

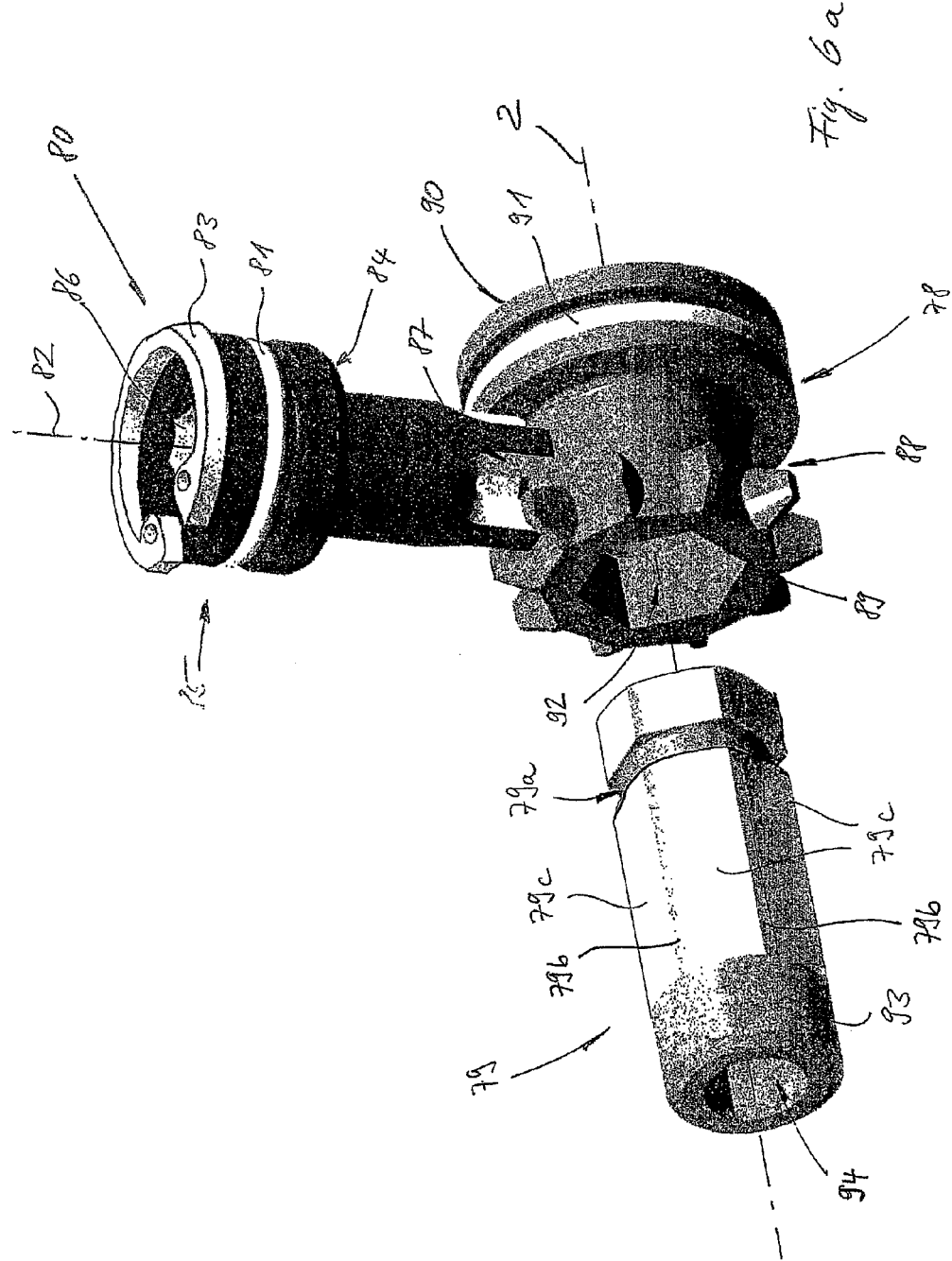

CHUCK FOR A TOOL

CROSS-REFERENCE TO RELATED APPLICATIONS

This application is a continuation of International Application No. PCT/DE2010/000782 having an international filing date of Jul. 7, 2010, and claims the benefit under 35 U.S.C. 119 sections (a)-(d) of German application 10 2009 032 182.9, filed Jul. 7, 2009, and German application 10 2009 039 683.7, filed Sep. 2, 2009, the entireties of which are incorporated herein by reference.

FIELD OF THE INVENTION

The invention relates to a chuck for a tool.

BACKGROUND OF THE INVENTION

A chuck for a tool is known from international patent application WO 2004/073910 A2. The chuck comprises a device for supplying a cooling and/or lubricating medium to a medium channel of a tool held in the chuck. Disposed in the chuck is a sleeve, which serves as a coupling for a supply line for the supply with cooling and/or lubricating medium, wherein a pipe element extends in the sleeve, an adjusting screw being disposed downstream of said pipe element. The adjusting screw can be adjusted in relation to the chuck in the direction of the longitudinal axis of the chuck and serves as a stop for a tool in order to adjust its clamped depth.

The pipe element is displaceable in the sleeve in the direction of the longitudinal axis of the chuck. It can be actuated via an adjusting tool on the side opposite the tool, the pipe element being fixedly connected to the adjusting screw.

SUMMARY OF THE INVENTION

The problem underlying the invention is to propose a chuck, wherein a variety of possible ways of implementing a clamping depth adjustment are made available with a straightforward adjustability of a clamping depth for a tool.

This problem is solved by the features of claims 1 and 2.

Advantageous and expedient developments of the invention are specified in the dependent claims.

The invention proceeds from a chuck for a tool with a device for supplying a cooling and/or lubricating medium to a medium channel of a tool held in the chuck. Disposed in the chuck is an adjusting screw which serves as a stop for the tool held in the chuck, wherein the adjusting screw can be adjusted in relation to the chuck in the axial direction of the chuck. The adjusting screw is in an interactive relationship with the pipe element.

A first essential aspect of the invention lies in the fact that the pipe element is held rotatably in the chuck, wherein securing means that limit, in particular completely prevent, an axial displacement at least in the direction of the adjusting screw are provided, and that the pipe element and the adjusting screw are connected in a fixed, but axially displaceable manner with respect to each other. A limitation of the axial displacement takes place in a predetermined range, preferably not by support of the pipe element on the adjusting screw, but rather by support on the remaining chuck.

As a result of this measure, it is possible to rotate the pipe element by means of a tool and thereby to transmit the rotation to the adjusting screw, wherein the latter is then moved away from the pipe element or moved towards the latter for example along a thread, depending on the direction in which rotation takes place.

Securing means are advantageously constituted on the pipe element.

Since the pipe element is disposed axially limited in movement, in particular fixed in relation to the adjusting screw, it can be integrated in diverse ways into an additional guide for cooling and/or lubricating medium, especially in the chuck.

A further essential aspect of the invention is to be seen in the fact that means are provided to actuate the pipe element from outside the chuck. It is thus possible to act on the pipe element from outside on the chuck and thus to operate the adjusting screw. In particular, the pipe element can be rotated from a lateral region on the chuck. In particular, the adjustment of the clamping depth for the inserted tool can also be carried out advantageously on the chuck when the chuck is coupled for example to a spindle of a machine tool and the pipe element is not accessible axially from the side of the chuck lying opposite the side of the inserted tool.

The means are advantageously constituted so as to actuate the pipe element in the radial direction of the chuck. The operation of the pipe element can take place for example on the chuck at right angles or obliquely to a longitudinal axis of the chuck. An access in readily accessible regions on the clamping element can thus be established, for example when there are unfavourable or difficult spatial conditions in the areas surrounding the chuck. The pipe element and with it the adjusting screw can thus be rotated in an uncomplicated manner and with comparatively little additional expenditure. The suitable radial or spatial orientation of an access to the means can be established in a variable manner, for example in a clamping section or a central section of the chuck.

It is also proposed that the means comprise a rotatably mounted coupling element, which can be actuated from outside the chuck and which is coupled with the pipe element. A connection from outside on the chuck to the pipe element lying inside is achieved with the coupling element. This can be solved in a space-saving manner, for example with a bolt-like or pin-like element in a suitably formed receptacle in the chuck. The coupling element, for example a rotatably mounted bolt, can be accommodated tightly in the chuck by means of sealing means. In particular, it is possible with a suitable rotary tool to act on an externally accessible engagement contour on the coupling element in order to rotate the coupling element in both directions of rotation from the exterior.

In order to transmit the rotary movement of the coupling element to the pipe element, the longitudinal axes whereof are differently orientated spatially, a suitable gearing or coupling arrangement can be provided, e.g. a friction clutch or an angular gear such as for example a toothed gear, in particular a bevel gear.

A sleeve is preferably provided, which serves as a coupling for a supply line for the supply of cooling and/or lubricating medium, wherein the pipe element extends in the sleeve. The transition between the sleeve and the pipe element is preferably sealed off with a seal, for example a lip seal. It is advantageous if the pipe element can be rotated in the sleeve. It is also conceivable for the pipe element to acquire axial securing of its movement in the sleeve by means of the securing means.

In a further particularly preferred embodiment of the invention, the pipe element follows on from the sleeve viewed in the direction of the adjusting screw, especially in a sealing manner.

In this case, it is advantageous for the pipe element to acquire axial securing of its movement by means of the securing means, which are constituted in a chuck base body of the chuck or in a part that is fastened therein.

The axial securing of the movement of the pipe element can take place by means of a locking ring, which for example is fitted on the one hand in a recess, in particular a groove, on the pipe element, and on the other hand in a recess, in particular a groove, on the remaining chuck, in such a way that the pipe element can rotate in respect of the locking ring, but that an axial movement is blocked, if required within a degree of play.

Alternatively or in addition, the securing means can comprise a stop on the pipe element and a counter-stop matching the latter on the remaining chuck. A stop collar on the pipe element that can abut against a shoulder on the chuck base body, for example, is conceivable, so that a rotation is possible, but no axial displacement, especially in the tool direction, from a predetermined axial position of the pipe element.

The pipe element can extend in the adjusting screw or be pulled on over a part of the adjusting screw. The important point is that the adjusting screw and the pipe element can be axially displaced in relation to each other, but that a mutual rotation is prevented. This can be achieved for example by a sliding seat, in the manner of a tongue and groove.

Non-rotatable cross-sections inserted into each other are also conceivable, such as for example a polygon or a kind of toothing system.

In particular, the pipe element can also be operated from the exterior by means of a tool and thereby be rotated about its longitudinal axis when the pipe element engages with the adjusting screw externally, for example when it is present pushed on or pulled on over an external section of the adjusting screw. The rotary transmission to the adjusting screw takes place with a rotation of the pipe element. The axial relative mobility between the pipe element and the adjusting screw is also present, being unaffected by this. The pipe element advantageously engages externally around at least one circumferentially running section on the adjusting screw. Accordingly, the adjusting screw can jut out axially on the pipe element with one or in particular with both longitudinal end sections.

In particular, the pipe element is provided with a through-opening, in which the adjusting screw at least partially engages or completely passes through.

The adjusting screw can be provided, for example at least in the section around which the pipe element engages, with a suitable rotary transmission contour, for example with an external hexagonal or an external toothed profile, which is matched to an internal counter-profile on the pipe element that fits the latter.

On the side of the adjusting screw pointing towards the clamping section, the section of the adjusting screw jutting out on the pipe element is in particular provided with an outer thread. This outer thread engages with a corresponding counter-thread in an opening in the chuck. By rotation of the pipe element with a tool and the accompanying rotation of the adjusting screw, an axial adjustment of the adjusting screw and therewith a stepless axial adjustment for a tool inserted in the chuck is carried out in a stepless manner. The arrangement described above is advantageous especially with regard to tool operability, ease of assembly, compact design and a reliable torque transmission from the pipe element to the adjusting screw.

In a further particularly preferred embodiment of the invention, the pipe element can be actuated by means of an adjusting tool on the side lying opposite the tool.

An engagement can also be constituted on the adjusting screw. An engagement on the adjusting screw or on the pipe element can be embodied for example as a slot, an internal polygon, in particular an internal hexagon or an inner-Torx seating.

BRIEF DESCRIPTION OF THE DRAWING FIGURES

FIGS. 1a and 1b represent a first example of embodiment of a chuck 1.

Figure 3A:
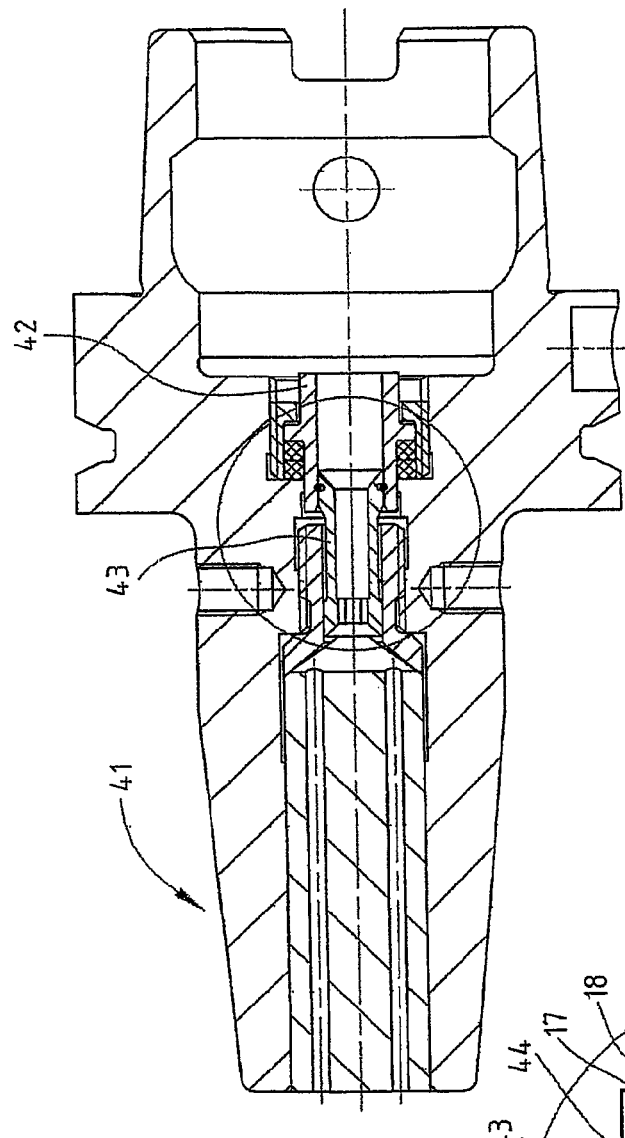
Figure 3B:
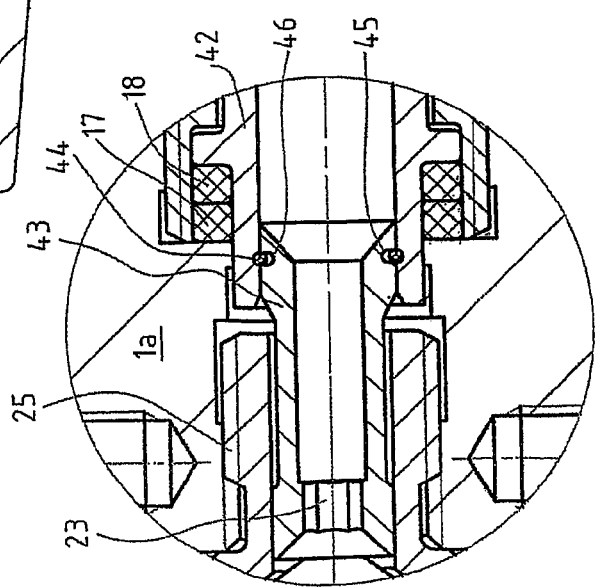

A third embodiment of a chuck 41 is shown in FIGS. 3a and 3b.

Figure 4A:
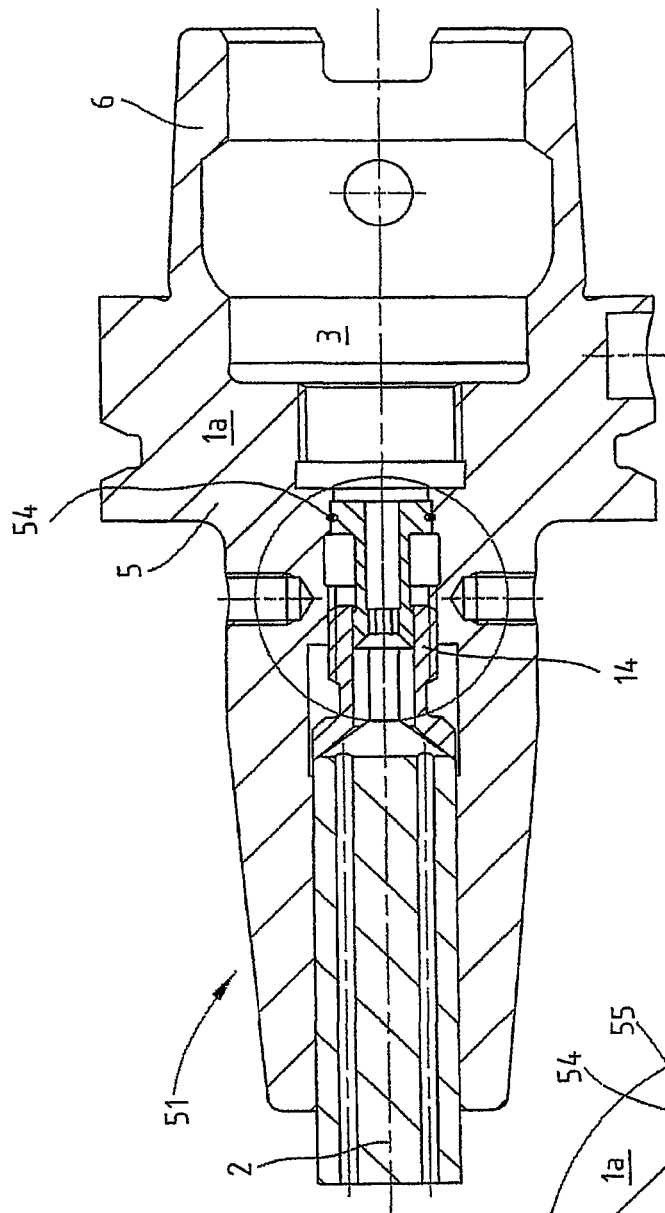
Figure 4B:
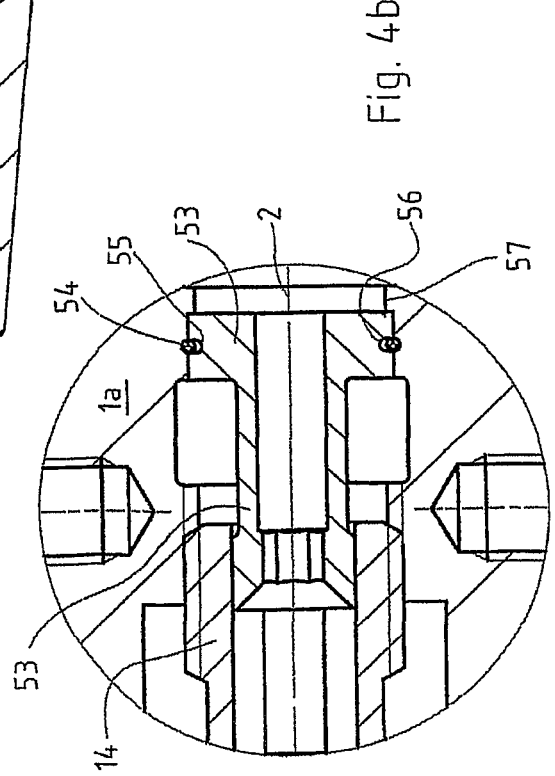

A further chuck 51 is depicted in FIGS. 4a and 4b.

Figure 5A:
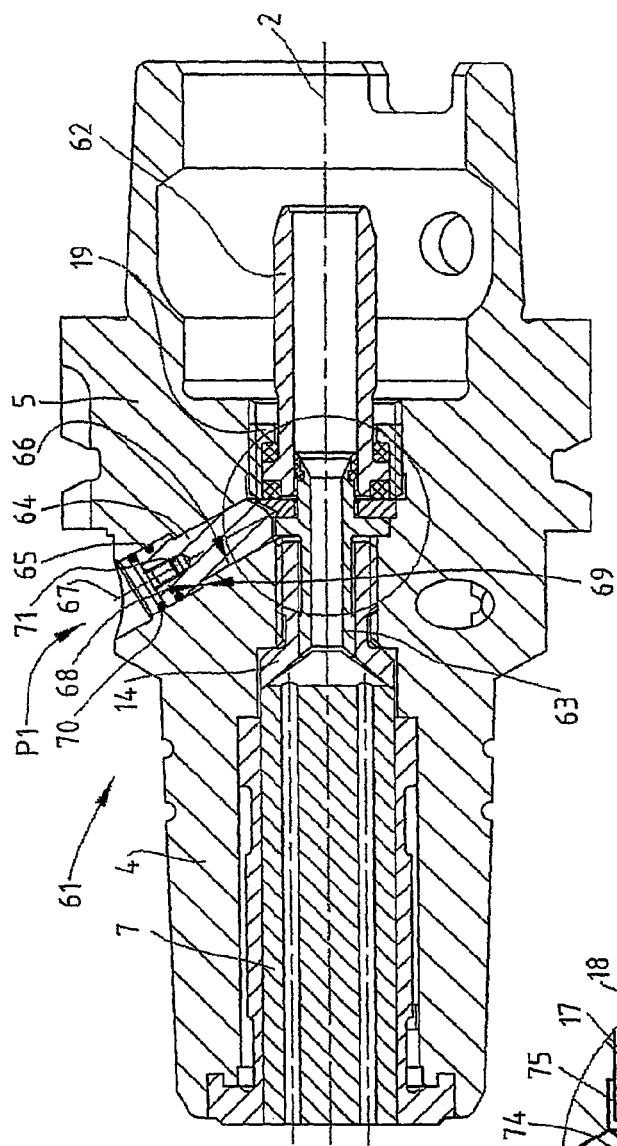
Figure 5B:
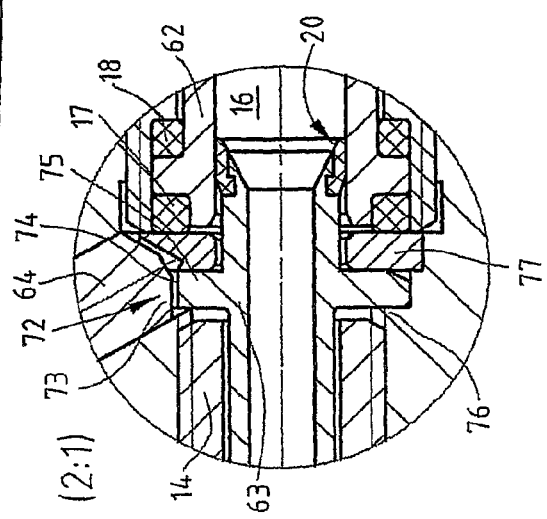

FIGS. 5a and 5b show an alternative embodiment of a chuck 61 which, apart from a pipe element 63 and a rotatably mounted bolt 64, essentially corresponds to the embodiments according to FIGS. 1a and 1b to 3a and 3b.

Figure 6:
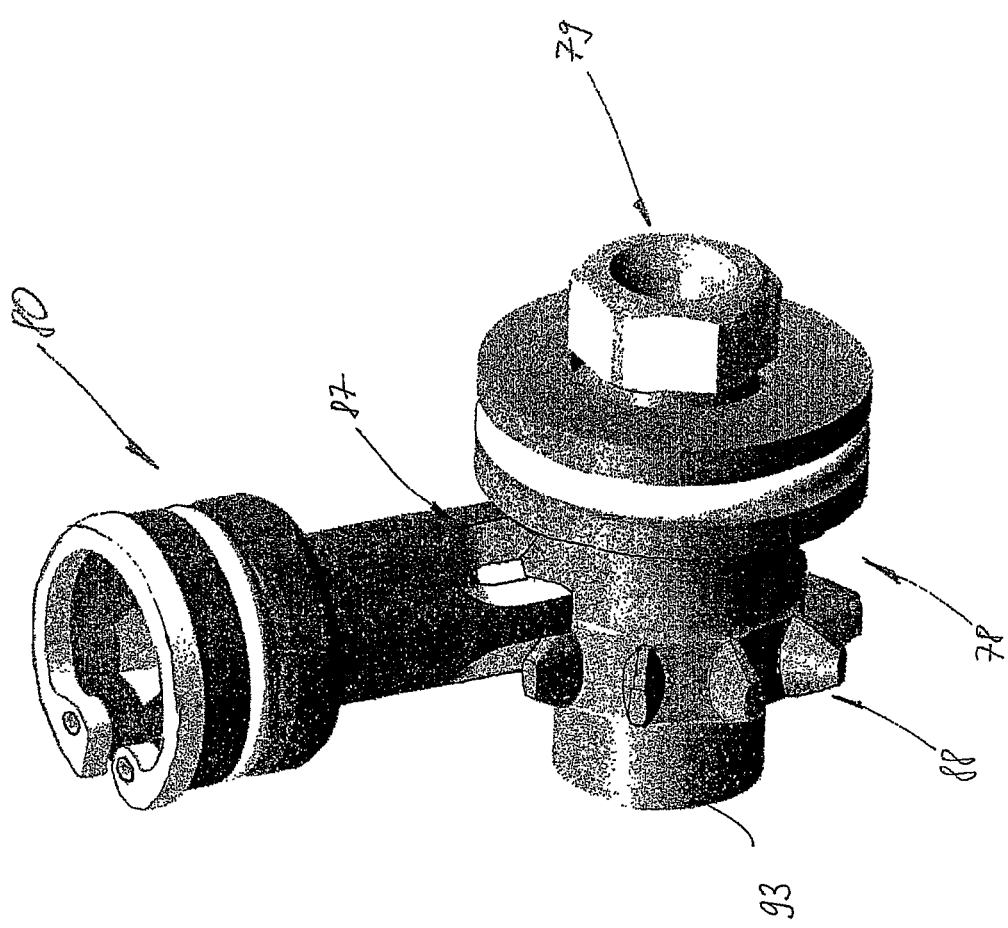

FIG. 6a shows diagrammatically and in perspective, partly in an exploded representation, a further embodiment of parts of a chuck according to the invention with an adjusting screw and a pipe element together with an accompanying engagement element.

FIG. 6b shows the arrangement according to FIG. 6a in a further perspective view, wherein the pipe element is engaged around the adjusting screw in a state of the chuck assembled in a functionally correct manner.

Figure 7:
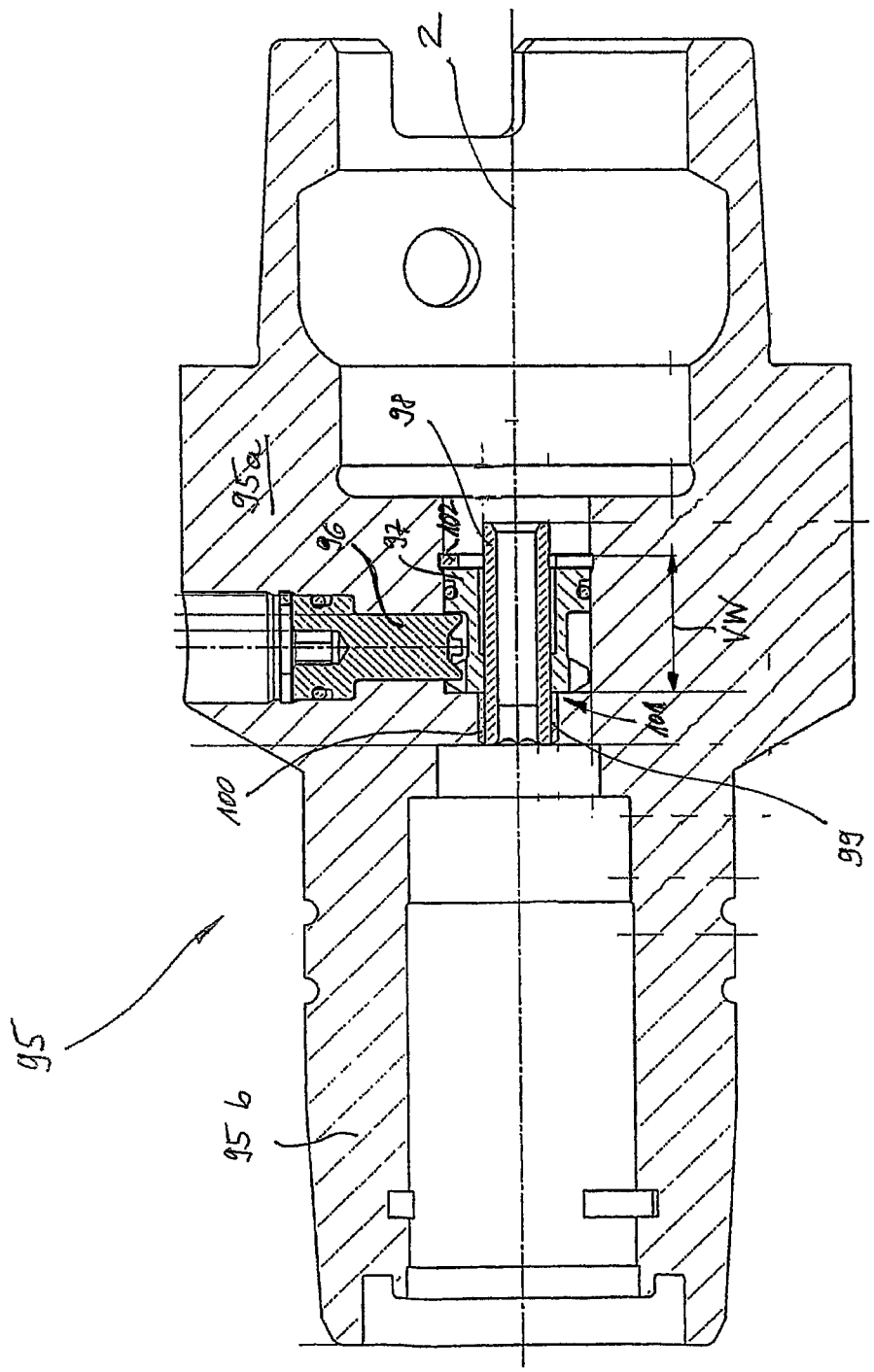
Figure 8:
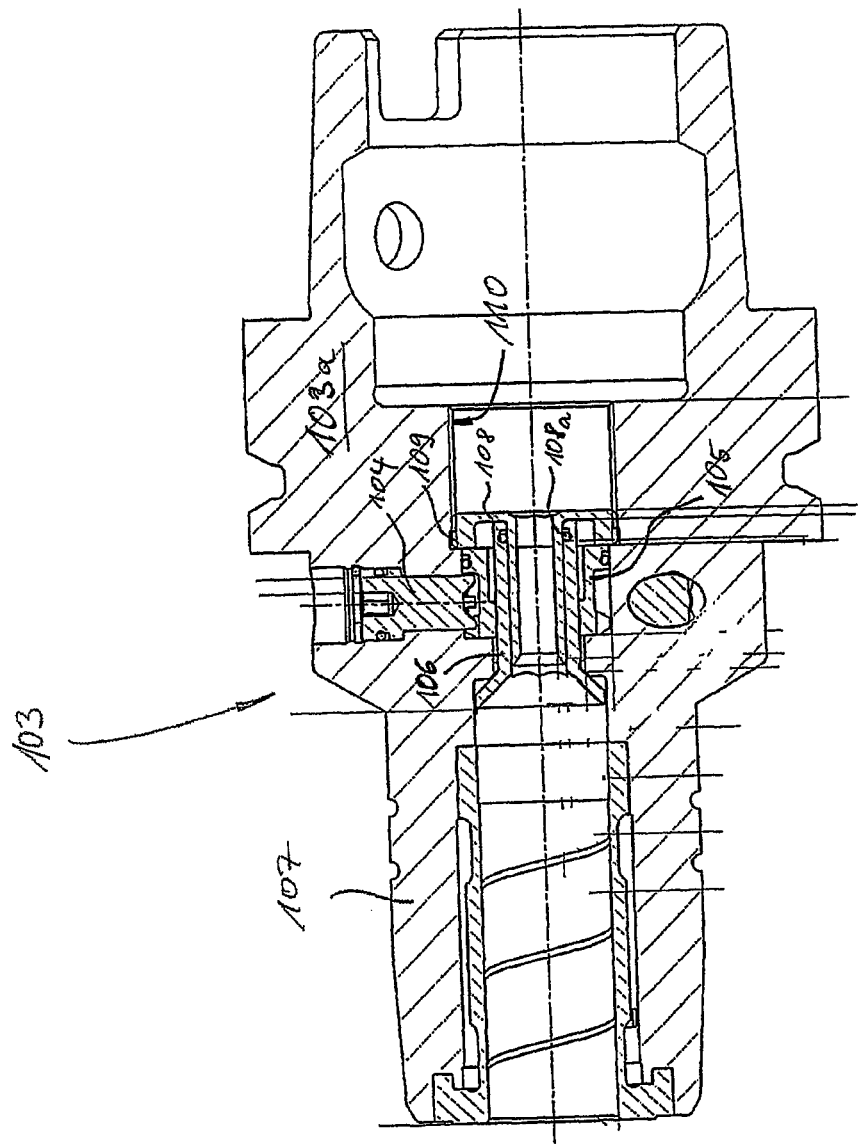

FIGS. 7 and 8 show further examples of embodiment of a chuck according to the invention in cross-section with an adjustment principle represented according to FIGS. 6a and 6b.

DETAILED DESCRIPTION OF THE INVENTION

Several examples of embodiment of the invention are represented in the drawings and are explained further below with an indication of further advantages and details.

An example of embodiment of the invention is represented in FIGS. 1a and 1b to 5a and 5b, in each case in a cross-section along the longitudinal axis and in an enlarged detail which is marked in each case in the cross-sectional view.

FIG. 6a shows very diagrammatically and in perspective, partly in an exploded representation, a further embodiment of parts of a chuck according to the invention with an adjusting screw and a pipe element together with an accompanying engagement element.

FIG. 6b shows the arrangement according to FIG. 6a in a further perspective view, wherein the pipe element is engaged around the adjusting screw in a state of the chuck assembled in a functionally correct manner.

FIGS. 7 and 8 show further examples of embodiment of a chuck according to the invention in cross-section with an adjustment principle represented according to FIGS. 6a and 6b.

FIGS. 1a and 1b represent a first example of embodiment of a chuck 1. Chuck 1 has a longitudinal axis 2 along the latter, a hole 3 running through chuck 1. Hole 3 has different diameters in different sections.

Chuck 1 comprises a clamping section 4, a middle section 5 and a coupling section 6.

Clamping section 4 is intended to receive a tool 7 (only the rear part of a tool is depicted in FIG. 1*a*), said tool comprising medium channels 8, 9 for transporting cooling/lubricating medium to a tool tip not represented. Medium channels 8, 9 proceed from a bottom face 10 on tool 7. Disposed in central section 5 in hole 3 is a device 11 for supplying cooling/lubricating medium to medium channels 8, 9.

The coupling of the chuck to a spindle (not represented) of a machine tool takes place via coupling section 6, wherein cooling/lubricating medium is fed to device 11 from the spindle via a line (also not represented).

Device 11 essentially comprises a sleeve 12, a pipe element 13 and an adjusting screw 14.

Pipe element 13 extends on one side in an opening 15 of adjusting screw 14 and on the other side in an opening 16 of sleeve 12. The two openings 15, 16 are through-openings. Sleeve 12 is screwed with two O-rings 17, 18 by means of a screw element 19 into a chuck base body 1*a*. As a result of this bearing of sleeve 12 between O-rings 17, 18, sleeve 12 can to a certain extent move elastically out of axis 2 of chuck 1.

Pipe element 13 is mounted in sleeve 12 in a displaceable and rotatable manner. In order to achieve a tight transition between the two elements 12, 13, a lip seal 20 is provided on pipe element 13.

Pipe element 13 comprises a peripheral collar 21, which abuts against a shoulder 22 in chuck base body 1*a* in the direction of tool 7 in the represented position, so that pipe element 13 cannot move farther in this direction.

Pipe element 13 further comprises an internal hexagon 23. It is possible with a tool to engage in internal hexagon 23 from the side of coupling section 6 through sleeve 12 and a through-opening 24 in pipe element 13.

The following takes place when pipe element 13 is rotated:

Adjusting screw 14 is connected rotationally fixed to pipe element 13. However, the two components can be displaced axially with respect to each other. Adjusting screw 14 is screwed into a thread 25 of chuck base body 1*a*. As a result of rotating pipe element 13, adjusting screw 14 also rotates automatically, said adjusting screw either moving axially towards tool 7 or away from the latter along thread 25. An axial stop for tool 7 can thus be established, wherein a tight, gap-free transition between adjusting screw 14 and base 10 of tool 7 is always guaranteed for a lubricant/coolant flow that is as undisturbed as possible. When there is a rotation of pipe element 13, which brings about screwing-in of adjusting screw 14, pipe element 13 remains fixed, since a displacement in the direction of the tool is prevented by stop collar 21, which abuts against shoulder 22 during the rotation.

In the other axial direction, a movement of pipe element 13 is limited by sleeve 12, against which stop collar 21 can abut with corresponding rotation of the adjusting screw.

Figure 2A:
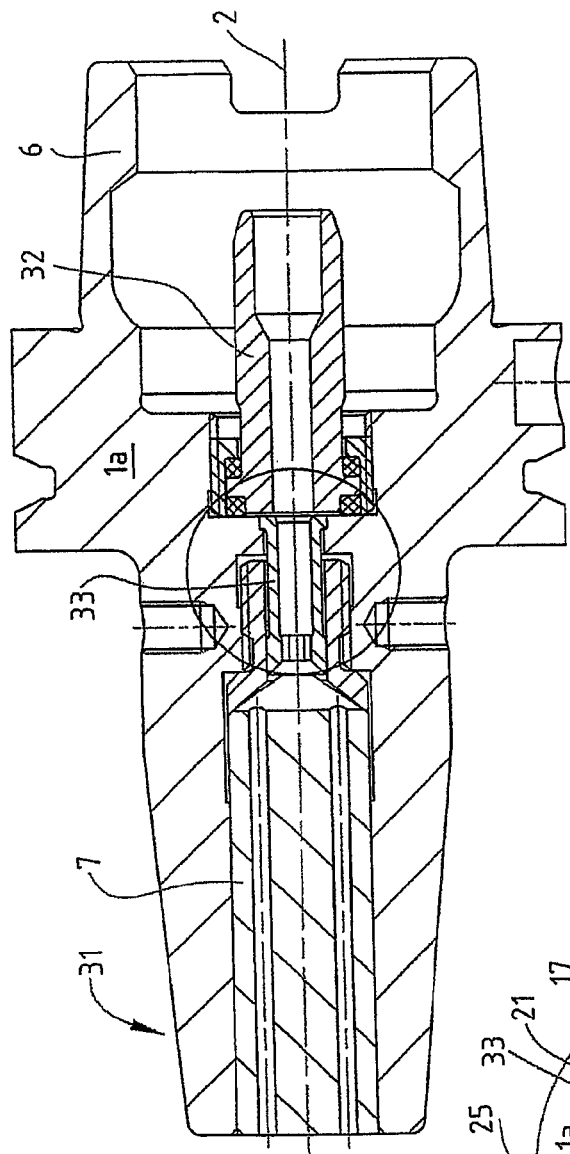
FIGS. 2a and 2b represent a further embodiment of a chuck 31.
Figure 2B:
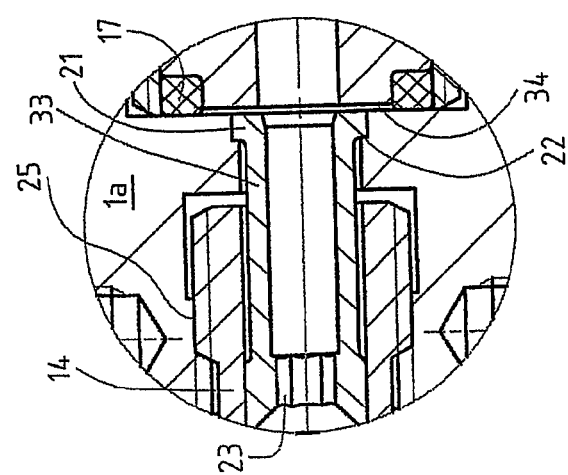

FIGS. 2*a* and 2*b* represent a further embodiment of a chuck 31. This chuck 31 corresponds, except for pipe element 33 and sleeve 32, to the embodiment according to FIGS. 1*a* and 1*b*. The remaining elements accordingly have the same reference numbers.

In the case of chuck 31, pipe element 33 is not introduced into sleeve 32. On the contrary, pipe element 33 follows sleeve 32 with a gap 34 in the direction of tool 7. Pipe element 33 also comprises a stop collar 21 to secure the latter axially. Pipe element 33 can abut against sleeve 32 in the direction of coupling section 6.

The functionality in the interplay between adjusting screw 14 and pipe element 33 corresponds to that explained for chuck 1.

As a result of pipe element 33 lying adjacent to sleeve 32 without these parts being slid into one another, a sealing element, such as for example lip seal 20 according to chuck 1, can be dispensed with.

A third embodiment of a chuck 41 is shown in FIGS. 3*a* and 3*b*. All the parts correspond to the embodiments of chuck 1, 31 with the exception of sleeve 42 and pipe element 43. As in the case of chuck 1, pipe element 43 projects into sleeve 42. In this embodiment, pipe element 43 is axially secured in both directions by a ring element 44, which on the one hand is inserted in a groove 45 in sleeve 42 and on the other hand in a groove 46 of pipe element 43, in such a way that an axial displacement is blocked in both directions, apart from a degree of play.

As a result of this mounting, pipe element 43 remains rotatable, but does not lose the functionality described in the embodiment according to FIGS. 1*a* and 1*b* with regard to the interaction with adjusting screw 14.

With a rotation of pipe element 43 via internal hexagon 23, adjusting screw 14 is either screwed in or out in the axial direction and is thus displaced axially.

Sleeve 42 is also mounted elastically by means of two O-rings 17, 18, but in relation to embodiments 1, 31 is constituted shortened for another kind of coolant/lubricant transfer.

As a result of the axial securing of pipe element 43 by means of a ring element 44, a stop and a counter-stop, as in previously described embodiments 1, 31, can be dispensed with for pipe element 43.

A further chuck 51 is depicted in FIGS. 4*a* and 4*b*. The latter essentially corresponds, apart from pipe element 53, to chuck examples of embodiment 1, 31, 41. No sleeve 12 is present in the case of chuck 51. Pipe element 53 is mounted directly in base body 1*a* of chuck 21. An annular groove 54 is provided in hole 3 in central section 5 and an annular groove 55 is also worked into pipe element 53 for this purpose. Inserted into the volume of the two grooves 54 and 55 is a ring element 56, which blocks an axial displacement of pipe element 53 along longitudinal axis 2. Also formed in chuck base body 1*a* in the direction of coupling section 6 is a shoulder 57, which prevents an axial displacement of pipe element 53 in the direction of coupling section 6.

As for the rest, the functionality corresponds to that of embodiments 1, 31 and 41, with regard to the interplay between pipe element 53 and adjusting screw 14.

If, in chuck embodiments 1, 21, an axial displaceability is also enabled to a predefined extent in the direction of the coupling section, the pipe element is fixed in chucks 41 and 51 by the securing means in both axial directions, apart from a degree of play if required.

FIGS. 5*a* and 5*b* show an alternative embodiment of a chuck which, apart from a pipe element 63 and a rotatably mounted bolt 64, essentially corresponds to the embodiments according to FIGS. 1*a* and 1*b* to 3*a* and 3*b*. In the case of chuck 61, an adjustment of the clamping depth that can be actuated radially with respect to a longitudinal axis 2 of chuck 61 is enabled. Chuck 61 according to FIGS. 5*a* and 5*b* is constituted by way of example as a hydro-expansion chuck. The invention is not however limited to the kinds of chucks shown in the figures, but also relates to other chucks, e.g. shrink chucks.

According to FIGS. 5*a*, 5*b*, an adjusting screw 14, which is constituted according to adjusting screws 14 of the examples of embodiment from FIGS. 1a and 1b to 4a and 4b, is adjusted axially via pipe element 63.

Bolt 64 is mounted rotatably in an opening 66 in a central section 5 of chuck 61 and is accommodated in a sealed manner by means of an O-ring 65. Bolt 64 and its longitudinal axis 67 and opening 66 are inclined obliquely at an angle of approx. 55 degrees with respect to longitudinal axis 2 in clamping section 4, in which a tool (shown only in part) is clamped. This angle can however also be smaller or larger, and if need be can also amount to approx. 90 degrees or more.

For its axial fixing, bolt 64 comprises on the one hand a peripheral shoulder 68, which abuts against a countershoulder 69 in opening 66, and on the other hand there is provided in a groove of opening 66 a locking ring 70, against which bolt 64 abuts with its outer end.

For the engagement of a rotary tool in bolt 64, there is formed in its head region accessible from the exterior an engagement contour 71, for example in the shape of an internal hexagon. Operation of adjusting screw 14 and the adjustment of the clamping depth of chuck 64 in the direction of arrow P1 according to FIG. 5a can thus advantageously take place.

When the bolt is rotated to the left or to the right, pipe element 63 is correspondingly rotated and with it adjusting screw 14 axially in the direction of clamping section 4 or in the direction of a sleeve 62, according to the previously described interrelationships. For this purpose, adjusting screw 14 and pipe element 63 are in particular connected rotationally fixed with respect to each other and axially displaceable with respect to each other.

In order to transmit the rotary motion of bolt 64 to pipe element 63, a bevel gear 72 is provided with tooth profiles 73, 74 engaging with each other in a matching manner. For this, bevel gear 72 comprises tooth profile 73 running around the periphery at the end face on bolt 64, said tooth profile being present on the end of bolt 64 extending up to pipe element 63. Tooth profile 74 is constituted, for example, as a tooth crown on a peripheral collar 75 on pipe element 63.

Pipe element 63 is fixed axially in its position in central section 5 by means of collar 75, which abuts against a shoulder 76 in central section 5. In the direction of sleeve 62, collar 75 is secured against a ring element 77, against which sleeve 62 abuts with two O-rings 17, 18. Sleeve 62 is screwed into chuck 61 by means of a screw element 19.

Pipe element 63 extends with its end remote from the clamping section into an opening 16 of sleeve 62, in which pipe element 63 is mounted rotatably. A tight transition between the two elements 62 and 63 is achieved by means of a lip seal 20.

FIG. 6a shows very diagrammatically and, particularly with the omission of a chuck base body, an alternative arrangement according to the invention with a pipe element 78, an adjusting screw 79 and a bolt 80 in an active connection with pipe element 78. Further elements of the chuck are not represented in FIGS. 6a and 6b, but essentially correspond to the embodiment according to FIGS. 5a, 5b. The chuck (not represented) belonging to the arrangement according to FIGS. 6a, 6b can be actuated radially with respect to a longitudinal axis 2 of the respective chuck for the axial adjustment of the adjusting screw and therefore of a tool inserted in the chuck. For this purpose, pipe element 78 and therefore adjusting screw 79 can be rotated by a rotation of bolt 80 in the clockwise or anticlockwise direction in the correspondingly assembled state of the chuck concerned.

Corresponding to bolt 64 in the example of embodiment according to FIGS. 5a and a 5b, bolt 80 is mounted rotatably, in the assembled state of the respective chuck, in a respective opening in a central section of the chuck running radially with respect to longitudinal axis 2 and is accommodated in the opening in a sealed manner by means of an O-ring 81. Bolt 80 or its longitudinal axis 82 is orientated at an angle of approx. 90° with respect to longitudinal axis 2. For the axial fixing or positioning in the corresponding hole in the central section of the chuck, bolt 80 is secured by means of a suitable groove or locking ring 83, for example an internal locking ring. Moreover, there is provided on bolt 80 a peripheral shoulder 84, which abuts against a countershoulder (not shown) in the respective opening in the central section.

In order to act from the exterior on the chuck ready the use, it is possible with a rotary tool, such as for example a spanner with an external hexagonal profile, to engage in bolt 80 in its head region 85 accessible from the exterior in the central section. For the torque transmission, bolt 80 comprises an engagement contour 86, for example with an internal hexagonal profile on head region 85. This essentially corresponds to the arrangement according to FIGS. 5a and 5b, so that the operation of adjusting screw 79 and therefore the adjustment of the clamping depth of the chuck takes place from a radial direction.

Provided on an inner end of bolt 80 opposite head region 85, on the end face and in a peripheral manner, is a tooth profile 87 which can interact with or is engaged with a tooth profile 88 formed on pipe element 78 on a collar 89 of pipe element 78. A transmission of the rotary movement of bolt 80 to pipe element 78 thus takes place corresponding to the example of embodiment according to FIGS. 5a and 5b, wherein the respective rotary movement can take place to the left or to the right.

In its position in the central section of the chuck, pipe element 78 is held securely in a sealed manner, amongst other things by a collar 90 with an O-ring 91 running around the periphery. A through-opening 92 in the longitudinal direction of pipe element 78 comprises an internal hexagonal profile in a section in which tooth profile 88 is formed externally.

The internal hexagonal profile is matched to fit with a corresponding external hexagonal profile which is present over substantial sections on adjusting screw 79, so that when adjusting screw 79 is inserted in through-opening 92 of pipe element 78, adjusting screw 79 is held in an axially displaceable, but rotationally fixed manner and is jointly rotated when pipe element 78 is rotated. Disposed at the front on a section of adjusting screw 79 facing towards the clamping section of the respective chuck is an outer thread 93, not shown in detail, which runs up to a peripheral groove 79a of adjusting screw 79 in intermediate regions 79b between thread-free hexagonal partial faces 79c. Outer thread 93 interacts with a matching inner thread in an opening in the base body of the chuck, so that when adjusting screw 79 is rotated, the latter can be adjusted so as to be movable in a stepless manner axially relative to the base body of the chuck and the axial adjustment of the respective tool present in the chuck thus takes place.

At the front on adjusting screw 79 following on from the section with outer thread 93, adjusting screw 79 can be extended in a differently shaped manner, for example widened funnel-shaped, to the cylindrical section of outer thread 93. In this further section, which serves at the end face as a stop for a tool inserted in the correct position in the chuck, central through-opening 94 shown in FIGS. 6a, 6b is also formed continuous for the passage of cooling medium or lubricating medium through adjusting screw 79.

FIG. 6b shows adjusting screw 79 in pipe element 78, assembled ready for operation of the chuck, with bolt 80 present on pipe element 78 in a side view, which in contrast with the view of FIG. 6a is offset in the direction of a coupling section of the respective chuck.

FIG. 7 shows a further chuck 95 according to the invention, which comprises an adjustment arrangement according to the principle represented in FIGS. 6a and 6b. Pipe element 97 can accordingly be rotated by means of a rotatably mounted bolt 96 when the latter is operated by means of a rotary tool and when bolt 96 is rotated in an appropriate direction of rotation by means of tooth profiles on bolt 96 and on pipe element 97 suitably matched to each other. An adjusting screw 98 inserted in pipe element 97 in a corresponding opening and connected in a rotationally fixed manner is thereby rotated. Adjusting screw 98 is axially displaceable in pipe element 97. An outer thread 99 on adjusting screw 98 formed in the axial direction over almost the entire length of adjusting screw 98 interacts with an inner thread 100 on a wall of a corresponding opening in a chuck base body 95a of chuck 95. Adjusting screw 98 in a chuck base body 95a can thus be adjusted axially with respect to longitudinal axis 2. Proceeding from the position shown in FIG. 7, a maximum adjustment path VW of adjusting screw 98 can thus be covered in the direction towards a clamping section 95b.

Pipe element 97 held rotatably in chuck base body 95a is fixed axially on the one hand by a shoulder 101 and on the other hand by a spring ring 102 in chuck base body 95a.

An alternative arrangement to FIG. 7 with a chuck 103 according to the invention is shown in FIG. 8. Chuck 103 comprises a rotatably mounted bolt 104, a pipe element 105 interacting with bolt 104 via corresponding tooth profile sections and an adjusting screw 106. Adjusting screw 106 is connected in a rotationally fixed manner to pipe element 105, but is axially mobile relative to pipe element 105. Pipe element 105 is axially fixed by means of shoulders in a chuck base body 103a, wherein an end facing away from clamping section 107 is secured against a shoulder formed by a cover element 108 that can be screwed in chuck base body 103a. Cover element 108 is screwed for this purpose in a through-opening in chuck 103, there being provided on a diameter-widened section of cover element 108 an outer thread 109, which interacts with a corresponding counter-thread 100c in the through-opening for the screwing-in in chuck base body 103a. With a hollow extension section, cover element 108 engages in adjusting screw 106 and is sealed with the latter by means of an O-ring 108a. Adjusting screw 106 can thus be displaced axially relative to the extension section of cover element 108.

Corresponding to the examples of embodiment according to FIG. 1a to FIG. 5b, adjusting screw 106 is formed funnel-shaped in the end located towards clamping section 107, which can act on a shaft of an inserted tool.

In FIGS. 7 and 8, bolts 96 and 104 and pipe elements 97 and 105 respectively interact according to the principle according to FIGS. 6a, 6b.

LIST OF REFERENCE NUMBERS 1 chuck
1a chuck base body
2 longitudinal axis
3 hole
4 clamping section
5 central section
6 coupling section
7 tool
8 medium canal
9 medium canal
10 bottom face
11 device for supplying cooling/lubricating medium
12 sleeve
13 pipe element
14 adjusting screw
15 opening
16 opening
17 O-ring
18 O-ring
19 screw element
20 lip seal
21 stop collar (securing means)
22 shoulder (securing means)
23 internal hexagon
24 through-opening
25 thread
31 chuck
32 sleeve
33 pipe element
34 gap
41 chuck
42 sleeve
43 pipe element
44 ring element
45 groove
46 groove
51 chuck
53 pipe element
54 annular groove
55 annular groove
56 ring element
57 shoulder
61 chuck
62 sleeve
63 pipe element
64 bolt
65 O-ring
66 opening
67 longitudinal axis
68 shoulder
69 counter-shoulder
70 locking ring
71 engagement contour
72 bevel gear
73 tooth profile
74 tooth profile
75 collar
76 shoulder
77 ring element
78 pipe element
79 adjusting screw
79a groove
79b intermediate region
79c hexagonal partial face
80 bolt
81 O-ring
82 longitudinal axis
83 locking ring
84 shoulder
85 head region
86 engagement contour
87, 88 tooth profile 89 collar
90 collar
91 O-ring
92 through-opening
93 outer thread
94 through-opening
95 chuck
95a chuck base body
95b clamping section
96 bolt
97 pipe element
98 adjusting screw
99 outer thread
100 inner thread
101 shoulder
102 spring ring
103 chuck
103a chuck base body
104 bolt
105 pipe element
106 adjusting screw
107 clamping section
108 cover element
108a O-ring
109 outer thread
110 counter-thread

The invention claimed is:

1. A chuck for a tool, the chuck comprising:
a chuck base body;
an adjusting screw;
a pipe element; and
a bolt,
the bolt rotatable relative to an axis of the bolt, the bolt directly engaging the pipe element such that rotation of the bolt about the axis of the bolt causes the pipe element to rotate about an axis of the pipe element,
the pipe element directly engaging the adjusting screw such that rotation of the pipe element about the axis of the pipe element causes the adjusting screw to rotate about an axis of the adjusting screw, the adjusting screw axially movable relative to the pipe element,
the adjusting screw threaded directly on the chuck base body such that rotation of the adjusting screw about the axis of the adjusting screw causes the adjusting screw to move relative to the chuck base body along the axis of the adjusting screw,
the chuck base body comprising a shoulder that limits axial movement of the pipe element at least a first direction.

2. The chuck according to claim 1, wherein the chuck further comprises a sleeve and at least a first resilient element, the sleeve positioned within the chuck base body, the first resilient element between the sleeve and the chuck base body, at least a portion of the pipe element extending into an interior region defined by the sleeve.

3. The chuck according to claim 1, wherein at least a portion of the pipe element extends into the adjusting screw, or at least a portion of the pipe element extends onto the adjusting screw.

4. The chuck according to claim 1, wherein a sliding seat is provided as a rotary securing element between the adjusting screw and the pipe element, the sliding seat providing an arrangement in which (1) rotation of the pipe element about the axis of the pipe element causes the adjusting screw to rotate about the axis of the adjusting screw, and (2) the adjusting screw can move axially relative to the pipe element.

5. The chuck according to claim 1, wherein the pipe element is axially fixed by a locking ring.

6. The chuck according to claim 1, wherein a securing element comprises a stop on the pipe element, which is configured to abut against a counter-stop.

7. The chuck according to claim 1, wherein the chuck further comprises a sleeve, and a seal is provided between the sleeve and the pipe element.

8. The chuck according to claim 1, wherein the bolt comprises an engagement contour accessible from an exterior of the chuck, for the engagement of a rotary tool in the bolt.

9. The chuck according to claim 8, wherein the bolt has a first end and a second end, the first end exposed to an exterior of the chuck and comprising the engagement contour, the second end opposing the first end and having an end face in direct engagement with the pipe element.

10. The chuck according to claim 1, wherein the bolt is mounted in an opening through a circumference of the chuck.

11. The chuck according to claim 1, wherein the axis of the bolt is non-coaxial with an axis of the chuck.

12. The chuck according to claim 1, wherein the bolt is mounted entirely within the chuck.

13. The chuck according to claim 1, wherein the axis of the bolt is a rotational axis of the bolt.

14. The chuck according to claim 1, wherein the axis of the bolt is a center axis of the bolt.

15. The chuck according to claim 1, wherein the axis of the bolt is an axis of symmetry of the bolt.

* * * * *

UNITED STATES PATENT AND TRADEMARK OFFICE
CERTIFICATE OF CORRECTION

| | | |
|---|---|---|
| PATENT NO. | : 9,555,478 B2 | Page 1 of 1 |
| APPLICATION NO. | : 13/336377 | |
| DATED | : January 31, 2017 | |
| INVENTOR(S) | : Klaus Matheis | |

It is certified that error appears in the above-identified patent and that said Letters Patent is hereby corrected as shown below:

On the Title Page

Foreign Application Priority Data, Item (30):
Please change: "Feb. 9, 2009 (DE)...... 10 2009 039 683" to -- Sept. 2, 2009 (DE)......10 2009 039 683 --

Signed and Sealed this
Fourth Day of April, 2017

Michelle K. Lee
*Director of the United States Patent and Trademark Office*